United States Patent [19]

Grieshaber

[11] Patent Number: 4,786,022
[45] Date of Patent: Nov. 22, 1988

[54] ATTACHING DEVICE

[75] Inventor: Herman R. Grieshaber, Glenview, Ill.

[73] Assignee: Grieshaber Manufacturing Co., Norridge, Ill.

[21] Appl. No.: 53,322

[22] Filed: May 22, 1987

[51] Int. Cl.[4] .......................................... F16M 13/00
[52] U.S. Cl. .................................. 248/287; 248/231.3; 248/219.1; 403/374; 403/385
[58] Field of Search .................... 248/287, 219.1, 231.3, 248/124; 403/374, 409.1, 385; 24/68 CD, 69 TT

[56] References Cited

U.S. PATENT DOCUMENTS

| | | | |
|---|---|---|---|
| 384,784 | 6/1888 | Pihl | 248/287 X |
| 418,463 | 12/1889 | Hieatzman | 248/231.3 |
| 1,195,889 | 8/1916 | Willeford | 403/385 |
| 1,511,704 | 10/1924 | Buck | 248/231.3 X |
| 1,863,970 | 6/1932 | Donald | 403/385 |
| 2,958,110 | 11/1960 | McBrien | 248/124 X |
| 3,180,605 | 4/1965 | Ewaskowitz, Jr. | 248/311.2 X |
| 3,861,816 | 1/1975 | Zaidan | 403/385 |

Primary Examiner—Ramon S. Britts
Assistant Examiner—Karen J. Chotkowski
Attorney, Agent, or Firm—Neuman, Williams Anderson & Olson

[57] ABSTRACT

An attaching device is provided for securing a first support element in a selected position relative to an angularly disposed second support element. The device includes a base member having a first section disposed in face to face relation with respect to a first surface of the first support element and a second section extending angularly from the first section and engaging a second surface of the first support element. An edge portion of the base member second section is offset and forms a lip which engages a third surface of the first support element. The first and third surfaces are in generally opposed relation. Projecting from one side of the base member first section is an adjustably mounted first cam member which is in spaced relation to the base member second section. When in one position of adjustment, the first cam member coacts with the base member second section and wedges therebetween a selected segment of the first support element. A second cam member is adjustably mounted on the opposite side of the base member first section. When in one position of adjustment, the second cam member coacts with the base member first section and wedges therebetween a selected segment of the second support element.

10 Claims, 1 Drawing Sheet

4,786,022

ATTACHING DEVICE

BACKGROUND OF THE INVENTION

During a surgical operation, certain instruments implements and/or equipment must be held in a stationary position. Such instruments, implements, and/or equipment may include, chest spreaders, suction devices, lights, retractors or clamps. Because the surgeon and his or her assistant need unobstructed use of their hands, such instruments, implements and/or equipment are usually supported in place by conventional mechanical means which are releasably mounted on a rail provided on the operating table or some other stationary object. Various attaching devices for this purpose have heretofore been provided; however, they have generally been of the screw type, which includes a manually adjustable tightening bolt. Due to certain design characteristics these prior attaching devices have been beset with one or more of the following shortcomings: (1) because germs and bacteria can accumulate in the small crevices of the threads formed in various components thereof, proper cleaning and sterilizing of such components becomes a difficult and time-consuming operation; (2) typical screw or bolt type fasteners utilized in such devices inhibit quick attachment, release and/or mobility thereof so as to effect attachment or detachment of the device to a supporting member; (3) such devices require a person possessed of good dexterity and finger strength to effect a secure and stable attachment of the device to a supporting member; (4) the attaching devices are required to be assembled onto one end of the rail and then slid sidewise along the rail to the desired location prior to the start of the surgery; thus, if during the surgery an extra attaching device is required between two devices already supporting instruments, one device must either be disassembled from the rail and then reassembled thereon or the secured instrument must be transferred to another device; (5) previous devices are difficult or impossible to secure over sheets or shrouds customarily used in an operating environment; (6) previous devices are limited for use exclusively with a particular type or style of rail or supporting member.

SUMMARY OF THE INVENTION

Thus, it is an object of the invention to provide an improved attaching device which avoids the aforenoted shortcomings.

It is a further object to provide an attaching device which can be easily and expeditiously cleaned and sterilized.

It is a further object to provide an attaching device which allows the supported instrument, implement or equipment to be readily adjusted to various selected positions with respect to the patient.

It is a further object to provide an attaching device which can be mounted on a variety of supporting members.

It is a further object to provide an attaching device which may be secured over sheets or shrouds used in a surgical environment without tearing or defacing thereof.

In accordance with one embodiment of the invention, an improved attaching device is provided for securing instruments, implements and/or equipment (e.g. surgical) in predetermined locations relative to a given supporting member. The device includes a base member having a first section on opposite sides of which are adjustably mounted cam means. One cam means coacts with a second section of the base member to secure the device to the support member. Another cam means coacts with the base member first section to secure a support bar or post in a selected position to the device. The support bar is adapted to accommodate various instruments, implements and/or equipment. Both cam means may be adjusted between locked and unlocked positions with a minimal amount of manual effort.

DESCRIPTION OF THE DRAWINGS

For a more complete understanding of the invention, reference should be made to the drawings wherein.

DETAILED DESCRIPTION OF THE INVENTION

Figure 1:
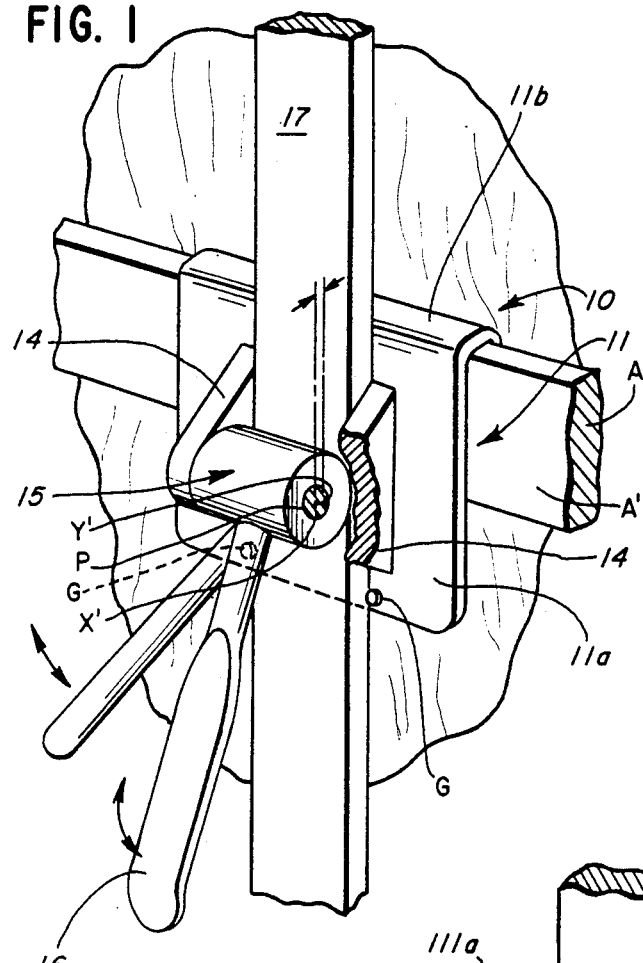
FIG. 1 is a fragmentary perspective side view of one embodiment of the improved attaching device shown mounted on a conventional supporting rail.

Referring now to the drawings and more particularly to FIG. 1, a preferred embodiment of the attaching device 10 is shown mounted on a horizontally disposed supporting rail or member A. Such a rail is a common component of an operating table on which a patient is positioned during a surgical procedure.

During such surgical procedures, it is frequently necessary for the surgeon to secure certain instruments, implements and/or equipment in stationary positions relative to the patient. To accomplish this result one or more attaching devices 10 are utilized. Each attaching device 10, sometimes referred to hereafter as a clamp, includes a base member 11 provided with a first section 11a which is adapted to engage in face to face relation the exposed exterior surface A' of the supporting rail, see FIG. 1. Projecting inwardly from the upper edge of the first section is a flange-like second section 11b. The second section overlies the top surface of the rail and has the inner edge portion 11c thereof offset downwardly so as to form a lip which engages the interior surface A" of the rail, see FIG. 2. The spacing between section 11a and lip 11c is such as to readily accommodate the thickness of the rail when the attaching device is mounted thereon.

Figure 2:
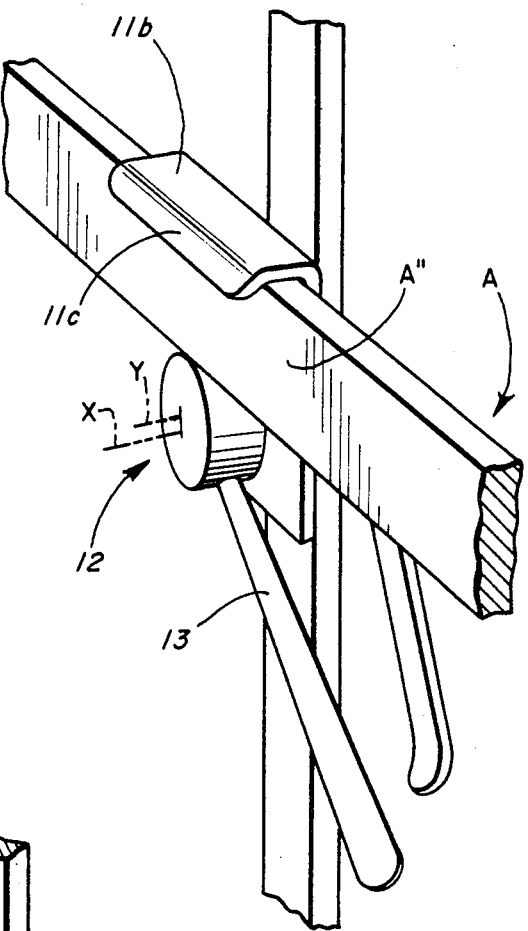
FIG. 2 is a fragmentary perspective view of the opposite side of the attaching device of FIG. 1 shown mounted on the sup rail.

Rotatably mounted on the interior surface of the first section 11a and spaced a predetermined distance beneath the second section 11b -is a first cam roller 12, see FIG. 2. The roller may have a cylindrical configuration with the axis of rotation X thereof offset with respect to the axis of the cylindrical roller Y. The axes X & Y are parallel to one another and are perpendicular to the interior surface of section 11a. Extending radially from the peripheral portion of the roller closest to axis X is an elongated handle or lever 13. The handle facilitates manual rotation of the roller 12 to either a locked or unlocked position. When the cam roller 12 is in a locked position the rail A is wedged between the periphery of the roller and the second section 11b of the base member 11. Because of the offset between axes X & Y, rails of varying widths may be accommodated by the attaching member 10.

Mounted on the exposed exterior surface 11a of the first section is a pair of transversely extending brackets 14. Disposed between the brackets and rotatably mounted thereon is a second cam roller 15. Roller 15 also has a cylindrical configuration with the axis of rotation X' thereof offset outwardly (away from section 11a) relative to the axis of the roller Y'. Axis X' is depicted in FIG. 1 by a pintle P. The axes X', Y' are parallel to each other and to the exposed surface of base member first section 11a. Roller 15 is manually rotated between locked and unlocked positions by manipulating a handle or lever 16. Handle 16 extends substantially radially from the periphery of roller 15 closest to the axis of rotation X'. When the handle 16 is manually pushed downwardly, the roller will wedge an upright support bar or post 17 between the periphery of the roller 15 and the exposed exterior surface of section 11a. As seen in FIG. 1, the support bar 17 is positioned between brackets 14 and, when the roller 15 is rotated upwardly to an unlocked position, the bar 17 is free to slide endwise (either up or down) relative to the device. Connected to the upper end portion of the bar, not shown, is one or more instruments, implements or pieces of equipment which the surgeon will need during the surgery. Once the bar 17 has been adjusted so that the instrument, implement or equipment is at the proper elevation relative to the patient, the handle 16 is merely pushed downwardly locking the bar in place. Disposed beneath each bracket 14 and vertically aligned therewith is a protruding guide G. The guides coact with one another to engage opposing sides of the support bar or post and prevent relative rotation of bar or post with respect to the base member 11 when the cam roller 15 is adjusted to an unlocked position.

Figure 3:
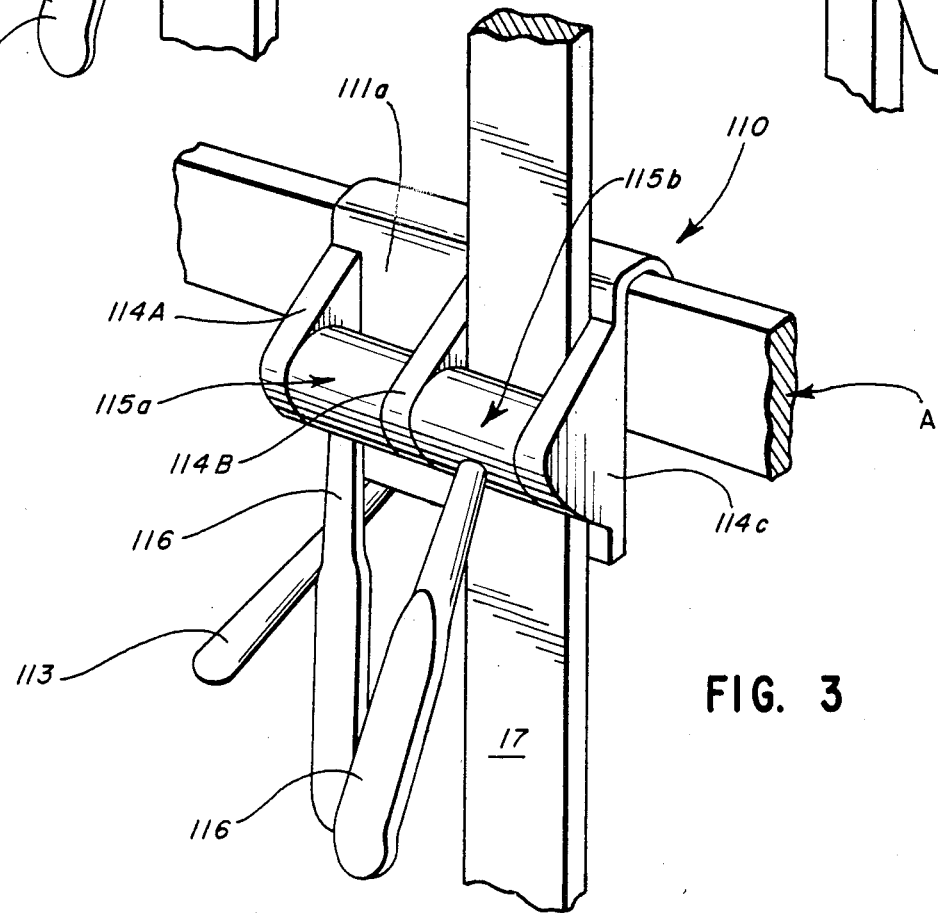
FIG. 3 is a fragmentary perspective side view of a second embodiment of the improved attaching device shown mounted on a supporting rail.

A modified attaching device 110 is shown in FIG. 3, which is provided with dual, cylindrically shaped, cam rollers 115a, 115b rotatably mounted on suitable brackets 114A, 114B, and 114C; the latter projecting outwardly from the exposed surface of base member section 111a. Each roller is rotatable about a common axis, not shown, which is offset outwardly from the axis of each roller. Bracket 114B is positioned between brackets 114A and 114C and coacts with each to support a pintle, not shown, about which the rollers rotate. Each roller 115a, 115b is provided with a radially extending handle or lever 116. The other handle 113, shown in FIG. 3 is connected to a cam roller, not shown, but is like the cam roller 12 shown in FIG. 2. Aside from the dual rollers 115a, 115b and associated brackets 114A, 114B and 114C, attaching devices 10 and 110 are of like construction.

It should be noted that both devices are of simple construction, easily cleaned and/or sterilized, and are adapted to be utilized with a variety of support rails, bars or posts. Due to the manner in which either device is attached to a support rail, a portion of the sheet, shroud, or covering, draped over the patient, may be readily clamped between the top of the rail and the flange-like section 11b or 111b of the base member 11 or 111 without damaging or tearing of such clamped portion because the device has no sharp or burred edges or corners. A further advantage of the improved device 10 or 110 is that it can be assembled on the support rail at the desired location without first having to have the device disassembled or have it attached first at one end of the rail and then moved endwise along the rail to the desired location.

One or more support bars or posts can be accommodated by device 110 and each bar or post is adjustable independently of the other.

The configuration of the various components of the attaching devices may vary from that shown without departing from the scope of the claimed invention.

I claim:

1. An attaching device for securing a first support element with a first surface, a second surface substantially parallel to said first surface and a third surface disposed between said first and second surfaces to a second support element disposed substantial perpendicularly relative to said first support element, said first support element having a medial portion and end portions; said device comprising a base member having a first section for disposition adjacent the first surface of said first support element, and a second section extending angularly from said first section for engaging the third surface of said first support element, said second section including an offset portion for disposition adjacent the second surface of said first support element; a first cam means adjustably mounted on said first section of said base member and extending angularly therefrom, said cam means being in spaced relation with said base member second section and when in one position of adjustment coacting with said base member second section for assembling said attaching device on the medial portion of said first support element and when in a second position of adjustment coacting with said base member second section for dissembling said attaching device from said first support element medial portion, said assembly and disassembly effected by lateral rather than endwise relative movement of said attaching device with respect to said first support element; and a second cam means adjustably mounted on the base member first section for securing said second support element in a position substantially perpendicular to said first support element, said first and second cam means being disposed on opposite sides of said base member first section, said second cam means when in one position of adjustment coacting with said base member first section for wedging therebetween a selected portion the second support element; both said first cam means and said second cam means being provided with means for effecting independent adjustment thereof, each cam means is rotatably adjustable about an independent axis, said independent axes being angularly disposed relative to one another.

2. The attaching device of claim 1 wherein the independent rotary axis of the first cam means is angularly disposed relative to said base member first section, and the independent rotary axis of the second cam means is in spaced substantially parallel relation with respect to a surface of the first section of said base member.

3. The attaching device of claim 1 wherein each cam means is provided with a peripheral pressure surface for wedgingly engaging a support element when the cam means is rotatably adjusted in one relative direction.

4. The attaching device of claim 1 wherein each cam means is provided with a handle for effecting manual rotation of said cam means.

5. The attaching device of claim 1 wherein each cam means has a cylindrical configuration with a central axis offset relative to the independent axis of rotation of said cam means.

6. The attaching device of claim 1 wherein the second cam means includes a plurality of cam elements independently adjustable relative to said base member and coacting therewith to wedge therebetween a plurality of second support elements when said cam elements are in predetermined positions of adjustment.

7. The attaching device of claim 6 wherein each cam element is mounted on said base member first section for rotation about an axis spaced from and substantially parallel to an adjacent surface of said base member first section.

8. The attaching device of claim 7 wherein said cam elements are rotatably adjustable about a common axis.

9. The attaching device of claim 1 wherein the second cam means is rotatably supported between a pair of brackets projecting from a surface of the base member first section, said brackets being adapted to be disposed on opposite sides of a second support element when the latter is wedgingly engaged by said second cam means.

10. The attaching device of claim wherein the cam elements of the second cam means are supported by brackets projecting from a surface of the base member first section.

* * * * *

UNITED STATES PATENT AND TRADEMARK OFFICE
CERTIFICATE OF CORRECTION

PATENT NO. : 4,786,022

DATED : November 22, 1988

INVENTOR(S) : Herman R. Grieshaber

It is certified that error appears in the above-identified patent and that said Letters Patent is hereby corrected as shown below:

Column 2, line 20, "sup" should be --supporting--

Column 2, line 54, the hyphen should be deleted.

Column 6, line 7, after "claim" the numeral 8 should be inserted.

Signed and Sealed this

Twenty-second Day of August, 1989

Attest:

DONALD J. QUIGG

Attesting Officer

Commissioner of Patents and Trademarks